United States Patent [19]
Dow et al.

[11] Patent Number: 5,877,778
[45] Date of Patent: *Mar. 2, 1999

[54] METHOD AND SYSTEM TO GENERATE A COMPLICATED COMPUTER ANIMATION BY USING A COMBINATION OF BASIC MOTION UNITS

[75] Inventors: Douglas Eric Dow, Singapore, Singapore; Kazuhiko Inada, Kadoma, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 571,293

[22] Filed: Dec. 12, 1995

Related U.S. Application Data

[63] Continuation-in-part of Ser. No. 337,566, Nov. 10, 1994.

[51] Int. Cl.⁶ .................................................. G06T 15/70
[52] U.S. Cl. ............................................................ 345/474
[58] Field of Search .................................. 395/173, 174, 395/175; 345/473–5

[56] References Cited

U.S. PATENT DOCUMENTS

| | | | |
|---|---|---|---|
| 5,101,364 | 3/1992 | Davenport et al. | 395/152 |
| 5,214,758 | 5/1993 | Ohba et al. | 395/164 |
| 5,261,041 | 11/1993 | Susman | 395/152 |
| 5,356,156 | 10/1994 | Suzuki et al. | 273/437 |
| 5,483,630 | 1/1996 | Unuma et al. | 395/175 |

OTHER PUBLICATIONS

Badler et al., Articulated Figure Positioning by Multiple Contraints, IEEE Computer Graphics & Applications, vol. 7, No. 6, pp. 28–38, 1987.

Morawetz et al., Goal–Directed Human Animation of Multiple Movements, Proc. Graphics Interface '90, pp. 60–67, May 1990.

Thalmann et al., Complex Models for Animating Synthetic Actors, IEEE Computer Graphics & Applications, vol. 11, No. 5, pp. 32–44, 1991.

Carlsson et al., How to Build a Multimedial Communication/Creation System for Music and Human Motion, Eurographics, Chapter 12, pp. 153–167, 1992.

Perlin, "Real Time Responsive Animation with Personality," IEEE Transactions on Visualization and Computer Graphics, vol. 1, No. 1, pp. 5–15, Mar. 1995.

T. Kimoto et al., "A Method of Frame Representation of Moving Objects for Knowledge–Based Coding", *Systems & Computers in Japan*, vol. 21, No. 7, pp. 63–74 (1990).

J.D. Foley & A. Van Dam, "Fundamentals of Interactive Computer Graphics", Addison–Wesley Publishing Co., 1984, pp. 262–275.

D. Dow, S. Semwal, F. Maehara, "Modeling Complex Human Shape Using Flexible Object Oriented Methodology", Proceedings of Nicograph '92, Tokyo, Nov. 1992, pp. 35–43.

T. Kunii et al., "Dynamic Analysis–Based Human Animation", CGI 1990, pp. 3–15.

M. Unuma et al., "Generation of Human Motion with Emotion", Computer Animation 1991 pp. 77–88.

(List continued on next page.)

*Primary Examiner*—Rudolph J. Buchel, Jr.
*Attorney, Agent, or Firm*—Ratner & Prestia

[57] ABSTRACT

A method and system for manipulating and mixing previously stored motion units for computer articulated figure animation. The motion units are combined in a weighted average. The weights give a priority to certain joint rotations of a motion unit which constitute the essence of that motion unit. The motion units can be mixed in an asynchronous fashion, with no limit on the number of motion units that can be mixed together. Phrasing control assigns a weight to each frame in a motion unit, and eases the transitions at the beginning and end of a motion unit. Frame-to-frame smoothing is also used. Fatigue of an articulated figure is simulated by the addition of a "tired" motion unit.

20 Claims, 19 Drawing Sheets

OTHER PUBLICATIONS

S. Steketee et al., "Parametric Keyframe Interpolation Incorporating Kinetic Adjustment and Phrasing Control", Siggraph 1985, pp. 255–259.

N. Burtnyk et al., "Interactive Skeleton Techniques for Enhancing Motion Dynamics in Key Frame Animation", Graphics and Image Processing, pp. 564–569, 1976.

H. Noser et al., "L–System Based Behavioral Animation", Computer Graphics and Applications, pp. 133–145, Aug. 30–Sep. 2, 1993.

J. Korein et al., "Techniques for Generating the Goal–Directed Motion of Articulated Structures", IEEE CG&A, pp. 71–81, Nov. 1982.

N. Badler et al., "Animation from Instructions", Department of Computer and Information Science, University of Pennsylvania, Chapt. 3, pp. 51–90.

C. Morawetz et al., "Goal–Directed Human Animation of Multiple Movements", Graphics Interface, 1990, pp. 60–67.

R. Boulic, et al., "Combined Direct and INverse Kinematic Control for Articulated Figure Motion Editing", Computer Graphics Forum, pp. 189–202.

Tom Calvert, "Composition of Realistic Animation Sequences for Multiples Human Figurs", Making them Move, Chapt. 2, pp. 35–50.

W.W. Armstrong et al., "Near–Real–Time Control of Human Figure Models", Graphics Interface '86, pp. 147–151.

T. Calvert et al., "Desktop Animation of Multiple Human Figures", IEEE Computer Graphics & Applications, 1993, pp. 18–26.

R. Boulic et al., "A Unified Framework for the Motion Manipulation of Articulated Figures with the Track System", pp. 45–50.

"B–Spline Curves (15)", Curves, pp. 125–147.

Foley et al, "Computer Graphics: Principle and Practice", Addison–Wesley Publishing Company, Inc., 1990, pp. 1060–1064.

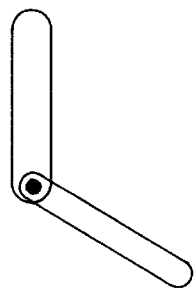 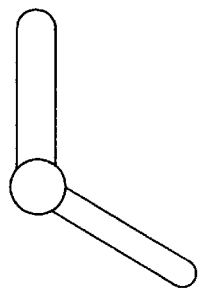 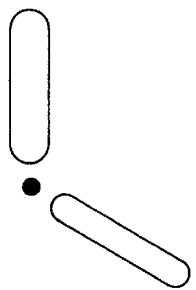 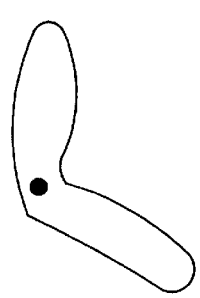
FIG. 10A    FIG. 10B    FIG. 10C    FIG. 10D
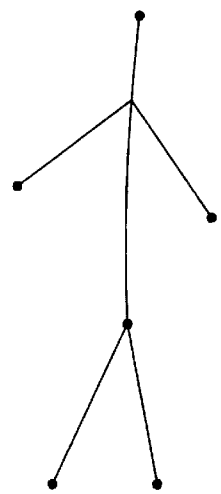 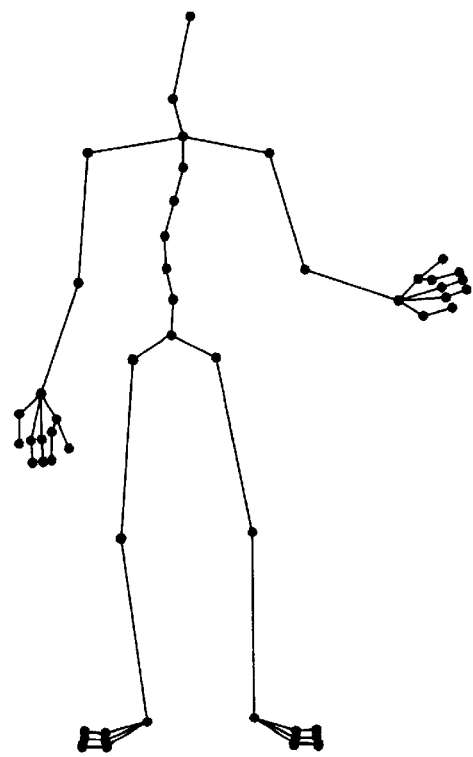
FIG. 11A    FIG. 11B

METHOD AND SYSTEM TO GENERATE A COMPLICATED COMPUTER ANIMATION BY USING A COMBINATION OF BASIC MOTION UNITS

This application is a continuation-in-part of copending application Ser. No. 08/337,566, filed Nov. 10, 1994.

FIELD OF THE INVENTION

The present invention relates to the field of computer graphics, specifically to articulated figure (AF) animation.

This invention is a method and a system to manipulate and mix previously stored Motion Units (MUs) for computer AF animation. In the course of an application, such as a game or an educational title, the user directs the movement of the AF by selecting previously generated and stored MUs. Then, by the methods and systems of this invention, those MUs are combined in a weighted average with all the MUs that the user has selected to be currently running.

BACKGROUND OF THE INVENTION

A new generation of personal computers (PCs) and video game machines is now coming onto the market. These are capable of performing 3D graphics such as articulated figure (AF) animation. However, traditional research and approaches to computer AF animation has focused on the Animator. That is, they have focused on helping a professional Animator make AF animation for a video or film that he/she is making. With this new generation of PCs and game machines, the user can now direct the AF animation; however, the above mentioned Animator-based algorithms are too computationally expensive. A professional Animator making a film can work off-line. The animation does not have to be generated in real-time, and it does not have to be interactive. The Animator can develop each frame of the animation, taking as much time as is necessary, then store the frame onto a storage medium. Later, all the stored frames can be played back rapidly at video speeds. However, interactive applications, such as games or educational software, must generate the 3D user-directed AF animation at, or close to, real-time. The methods and systems constituting the invention are aimed at the interactive game or educational applications which use computer AF animation.

The focus of the invention centers on manipulating Motion Units (MUs). These MUs define the articulated figure's orientation (joint rotations) for each frame in an animation sequence. The game or application creator uses separate methods (including rotoscopy, key-frames, dynamics, and kinematics) to create an MU. Then the algorithms of the invention manipulate and run the stored MUs as the game user directs. The algorithms are simple and fast so as to not overburden lower end machines (which are often required to generate one frame of video 30 times per second). Yet the motions that are created by manipulating and mixing the MUs are fairly smooth and natural looking. Above all, the user is in control.

The invention provides simple user-based algorithms which can rapidly manipulate previously stored MUs.

SUMMARY OF THE INVENTION

Previously stored Motion Units (MUs) that describe the joint rotations of an articulated figure (AF) for each frame in an animation sequence can be mixed together by a weighted sum calculation. The weights give a priority to certain joint rotations for a certain MU which constitute the "essence" of that MU. In other words, the joints of an MU that have been given a higher weight are deemed to be the more important joint rotations for that particular MU. The person who created the MU determines these joint weights. The goal is to determine the important joint rotations of an MU motion, and to give those joints a higher joint weight than the other joints. For example, in a punch motion for a human AF, the shoulder and elbow joints should be given a higher joint weight to stress the essence of the punch motion. Likewise, a kick MU should have the hip, knee, and ankle joints be assigned a much higher joint weight than unimportant joint rotations such as the wrist or the neck.

The MUs can be mixed in an asynchronous fashion, with no limit on the number of MUs that can be mixed together.

Phrasing control assigns a weight to each frame in a stored MU, and helps to ease the transitions at the beginning and end of an MU. This is accomplished by giving the frames at the beginning and at the end of an MU lower weights, and assigning higher weights to the middle frames.

Tiredness or fatigue of an AF can be simulated by adding a "Tired" MU, with a weight proportional to the tiredness-factor, to the current queue of concurrently running Mus.

BRIEF DESCRIPTION OF THE DRAWINGS

FIGS. 10 (a)–(d) show various embodiments of a joint in an articulated figure for the invention.

FIGS. 11 (a)–(b) show two examples of the skeleton of AF joints which are manipulated by the algorithms of the invention.

DESCRIPTION OF THE PREFERRED EMBODIMENTS

Figure 1:
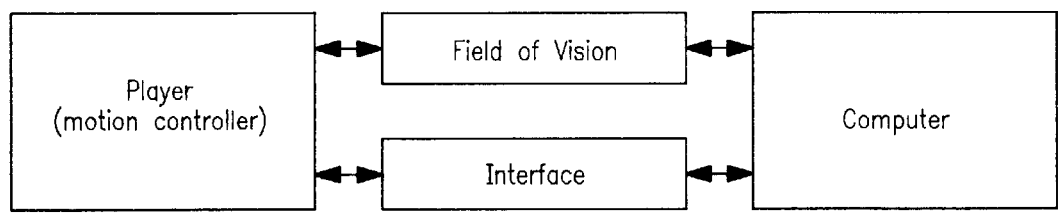
FIG. 1 shows the overall application environment in which the invention applies.

The preferred embodiment of the invention is in an interactive computer graphics game involving one or more animated articular figures that are visible to the player and are controlled by the player. The player asynchronously selects MUs for the articulated figure to execute. The algorithms specified by the invention mix the concurrently running MUs selected by the player. The result of this mix calculation is the rotation of each joint for the next frame in the animation. The articulated figure is positioned in the position specified by the calculated rotation angles and rendered so that it is visible to the players. In the preferred embodiment, the articulated figures are made visible by displaying them on at least one video monitor that is visible to the player.

Another embodiment of the invention can be a simulation of one or more articulated figures. The purpose would be to make an animation of articulated figures moving or to simulate some behavior of articulated figures as determined by a behavior or artificial intelligence (AI) algorithm that selects MUs for the articulated figures.

Another embodiment of the invention is the controlling of the motion of articulated figures in a Virtual Reality application. Either humans or software modules (e.g., the AI Program Agent in FIG. 2) select the next MU for the articulated figure to execute.

The invention allows the user to directly control the mixing of previously stored MUs. Examples of an MU are Bow, Wave, Shake Head, Walk, Punch, and Kick.

Before the game application starts, the MUs must have been previously created and stored. The boxes in FIG. 15 indicate some of the different techniques that have been developed to make realistic looking human motion. The methods shown in FIG. 15 are outside the scope of the invention. These are accomplished previous to the application described by the invention. However, after the MUs have been generated by the methods of FIG. 15 (or other methods) and stored in the MU Library of FIG. 14 (c), then the algorithms of the invention manipulate those stored MUs to produce AF motion as directed by the player. These methods have been developed and used by many researchers, and some are even commercially available. The motion generating methods include rotoscopy (described in Kunii T. L., Sun L., "Dynamic Analysis-Based Human Animation", Proc. Computer Graphics International '90 (CGI '90), Singapore, 1990, pp. 3–15; Unuma M., Takeuchi R., "Generation of Human Motion with Emotion", Proc. Computer Animation '91, Geneva, Switzerland, Springer-Verlag, 1991, pp. 77–88 and which are hereby incorporated by reference for their teachings on rotoscopy), key-frame (described in Steketee S. N., Badler N. I., "Parametric Keyframe Interpolation Incorporating Kinetic Adjustment and Phrasing Control", Proc. SIGGRAPH 1985, Computer Graphics, Vol. 19, No. 3, pp. 255–262; Burtnyk N., Wein M., "Interactive Skeleton Techniques for Enhancing Motion Dynamics in Key Frame Animation", Graphics and Image Processing, Association for Computing Machinery, 1976, pp. 564–569 and which are hereby incorporated by reference for their teachings on key-frame), dynamic procedural (described in Noser H., Thalmann D., "L-System-Based Behavioral Animation", Proc. Pacific Graphics '93, Seoul, Korea, Computer Graphics and Applications, World Scientific, Vol. 1, pp. 133–146 and which is hereby incorporated by reference for its teaching on dynamic procedural), kinematics (described in Korein J. U., Badler N. I., "Techniques for Generating the Goal-Directed Motion of Articulated Structures", IEEE Computer Graphics & Applications, Nov. 1982, pp. 71–81 and which is hereby incorporated by reference for its teaching on kinematics), AI procedural (described in Badler N. I., Webber B. L., Kalita J., Esakov J., "Animation from Instructions", Making Them Move: Mechanics, Control, and Animation of Articulated Figures, ed. Badler, Barsky, Zeltzer, Morgan Kaufmann Publishers, 1991, pp. 51–93; Morawetz C. L., Calvert T. W., "Goal-Directed Human Animation of Multiple Movements", Proc. Graphics Interface '90, Canada, 1990, pp. 60–67. and which are hereby incorporated by reference for their teachings on AI procedural), and various interactive mixed mode methods (described in Boulic R., Thalmann D., "Combined Direct and Inverse Kinematic Control for Articulated Figure Motion Editing", Computer Graphics Forum, Vol. 11, No. 4, 1992, pp. 189–202; Calvert T., "Composition of Realistic Animation Sequences for Multiple Human Figures", Making Them Move: Mechanics, Control, and Animation of Articulated Figures, ed. Badler, Barsky, Zeltzer, Morgan Kaufmann Publishers, 1991, pp. 35–50; Armstrong W. W., Green M., Lake R., "Near-Real-Time Control of Human Figure Models", Proc. Graphics Interface '86, Vision Interface '86, Canada, 1986, pp. 147–151; Calvert T., Bruderlin A., Dill J., Schiphorst T., Welman C., "Desktop Animation of Multiple Human Figures", IEEE Computer Graphics & Applications, May, 1993, pp. 18–26; Boulic R., Huang Z., Magnenat Thalmann N., Thalmann D., "A Unified Framework for the Motion Manipulation of Articulated Figures with the TRACK System", Proc. CAD/Graphics '93 Beijing, New Advances in Computer Aided Design & Computer Graphics, Ed. Tang Z., International Academic Publishers, Vol. 1, 1993, pp. 45–50 and which are hereby incorporated by reference for their teachings on various interactive mixed mode methods). Much energy, development, and refinement has gone into each of these methods of generating motions.

Moreover, any other method that has been developed in computer human animation research is appropriate to generate an MU if the following condition is met. The motion specified by the created MU must be of the form, or be able to be converted to the form, of the data structure shown in FIG. 17. That is, the motion is specified frame by frame. Each frame is specified by a series of angles that represent the rotation of each of the rotatable joints of the articulated figure. In the techniques listed in FIG. 15, the specification of an angle joint consists of three angle rotations. However, any scheme of joint specification is covered by the methodology of the invention so long as a particular joint of the articulated figure is specified by an angle, or a series of angles, in a consistent way from frame to frame. The angle's values must be of a type that can be manipulated by the mathematical equations shown in equation (1) (below) of the invention.

After generating a desired motion by one of the above techniques, the application developer needs to store that motion frame by frame. The key data to be stored is each joint's rotation information.

Figure 17:
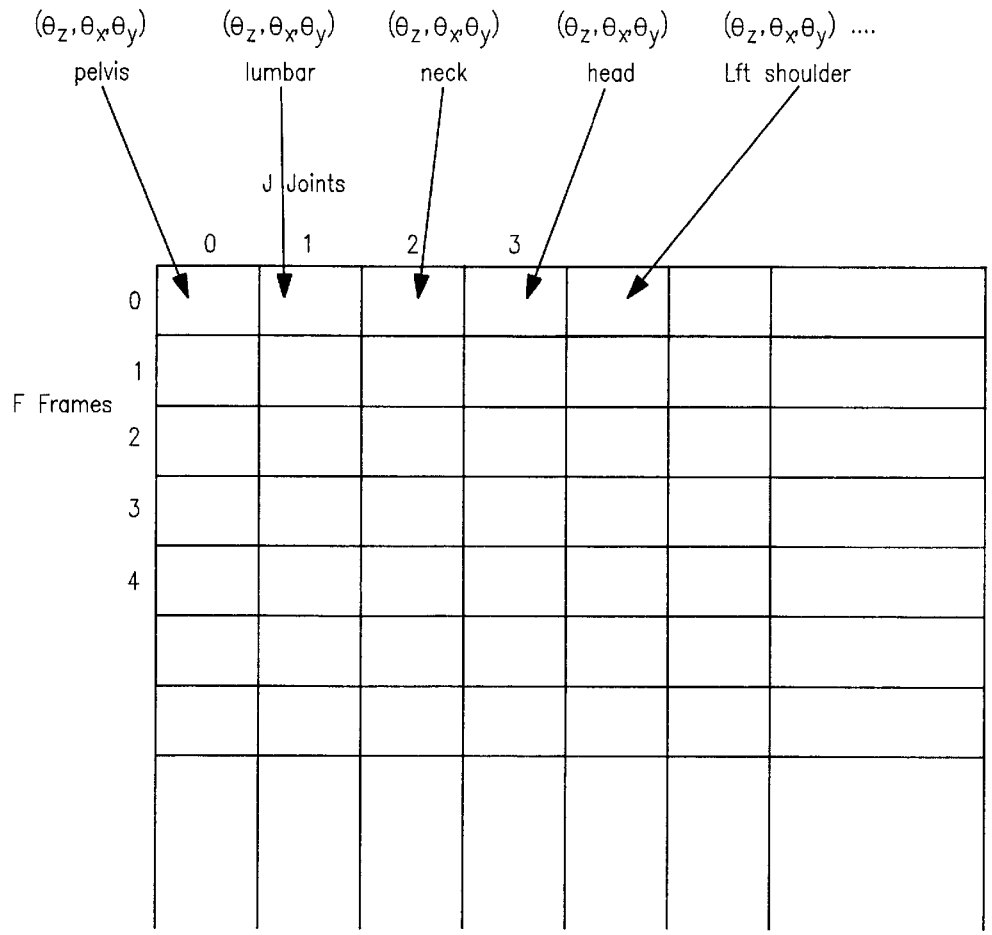
FIG. 17 shows the file specification of an MU.

There are a number of ways to specify the orientation of a joint. The motion mixing algorithms specified in the invention work well if the data consists of the rotation angle of the joint, where this angle is relative to itself (i.e. flexing, pivot, twisting), or relative to its parent joint's local coordinate system. FIG. 17 shows that an MU consists of rows of frames, where each frame consists of a sequence of joint rotation data.

As shown in FIG. 1, the invention relates to the environment of a "player" who is interacting through an "interface" with a "computer". Frames of visual images are fed back from the computer to the player. The invention is an algorithm being executed in the computer box of FIG. 1.

Figure 2:
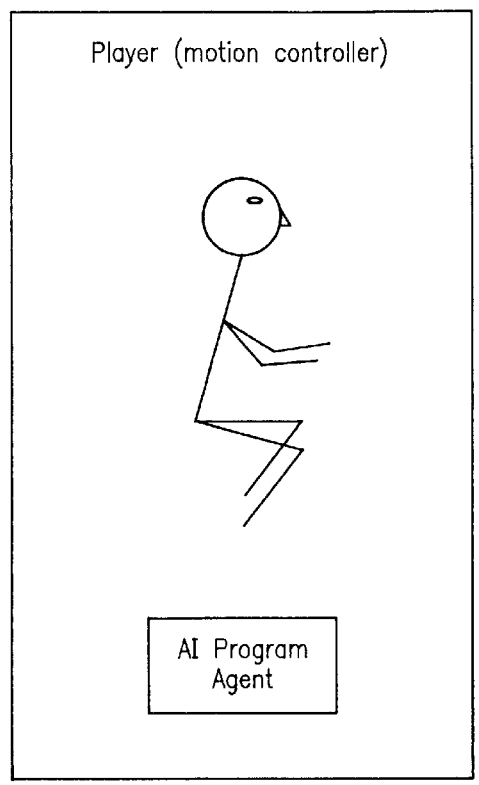
FIG. 2 further describes the "player" block of FIG. 1.

As shown in FIG. 2, in the preferred embodiment, the player of FIG. 1 is a human, but the player specified in the invention could also be a software, artificial intelligence, or other electrical/mechanical entity that simulates a human player's input to the interface and to the computer of FIG. 1. For example, instead of a human player selecting the next MU for the articulated figure to execute, a software module could select, by its internal program, the next MU for the articulated figure to execute. In this way, the "player" described in the invention can be a software program. This software module that is the "player" is labeled "AI Program Agent" in FIGS. 2, 6 (b), 7 (b), 8 (b), and 8 (c). A combination of the two is possible, where the human player is assisted by the AI program to control the movement of the AF.

Figure 3A:
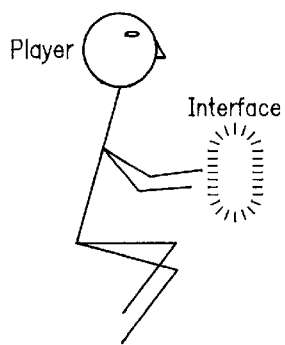
FIGS. 3 (a)–(c) further describe the "interface" block of FIG. 1.
Figure 3B:
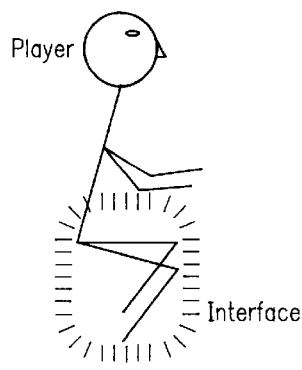
Figure 3C:
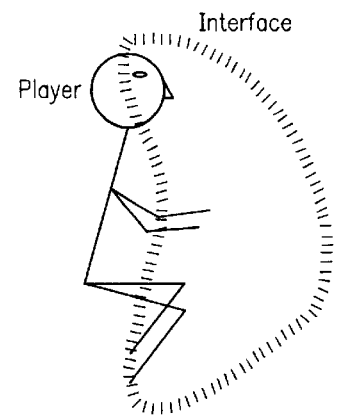

Various interfaces are possible for the user to input and possibly receive non-vision sensory feedback from the computer. As shown in FIG. 3 (a), the interface of FIG. 1 is a device that is manipulated by the hands. This includes all the currently used paradigms of interaction such as keyboard, joystick, data glove, button pad, and any other device that can be controlled by movements of the hand or hands. In addition, the interface of the invention can be a device that is manipulated by the motion of body parts in other regions of the body such as the legs, feet, knees and/or waist (FIG. 3 (b)), and motions of the face, eyes, head, ears, nose, neck or shoulders, or a combination of the above (FIG. 3 (c)). If the player of FIG. 1 and FIG. 2 is a software module, the interface is a device capable of detecting the commands of the software module. The commands could be software procedure calls, method calls, computer messages, electronic mail, light signals, and other electrical and/or mechanical medium for the AI Program Agent to input its commands through the interface to the computer of FIG. 1. The important thing is that the interface of this device is receiving input from the player and converting that input into AI selections for the articulated figure to execute.

Figure 4A:
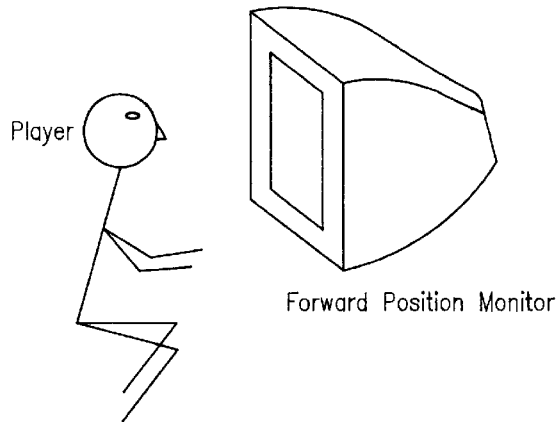
FIGS. 4 (a)–(b) further describe the "field of vision" block of FIG. 1.
Figure 4B:
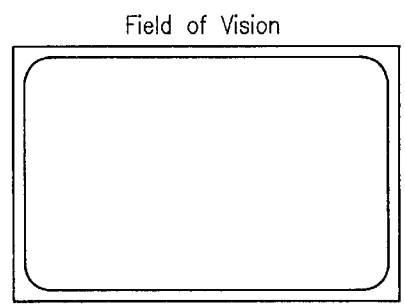
Figure 5A:
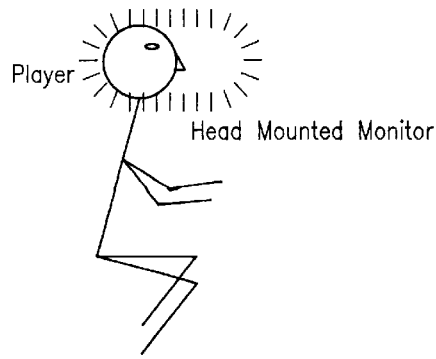
FIGS. 5 (a)–(b) further describe the "field of vision" block of FIG. 1.
Figure 5B:
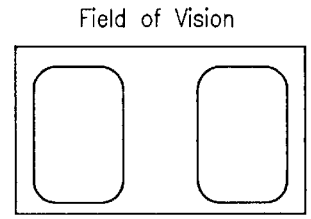

As shown in FIGS. 4 (a) and 4 (b), the Field of Vision of FIG. 1 displayed to the player, specifically a human player, is a video monitor projected in front of the player in the preferred embodiment of the invention. Examples of this include television, monitors, and projection systems. FIG. 4 (b) shows an example of the screen shape that the player would see. In addition, other visual systems that are further embodiments of the invention include head mounted visual systems such as those used in Virtual Reality applications, as shown in FIGS. 5 (a) and 5 (b). FIG. 5 (a) shows the possible configuration of a head mounted system. The computer-generated scene is projected close to the eyes, or even drawn directly onto the eye. Examples include flat screens and other head mounted vision systems. FIG. 5 (b) shows two views of the scene that could be generated and displayed, one for each eye of the player.

Figure 14A:
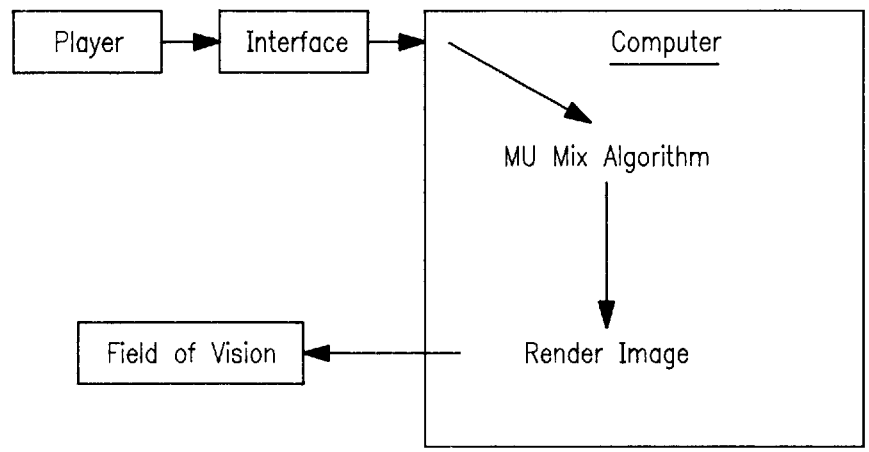
FIGS. 14 (a)–(c) further show the details of the invention as shown in FIG. 1.
Figure 14B:
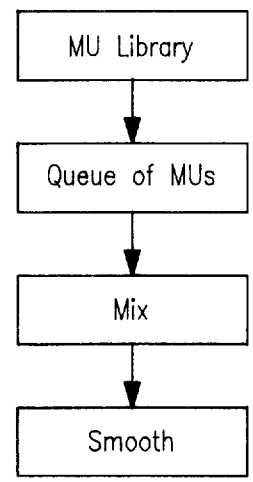
Figure 14C:
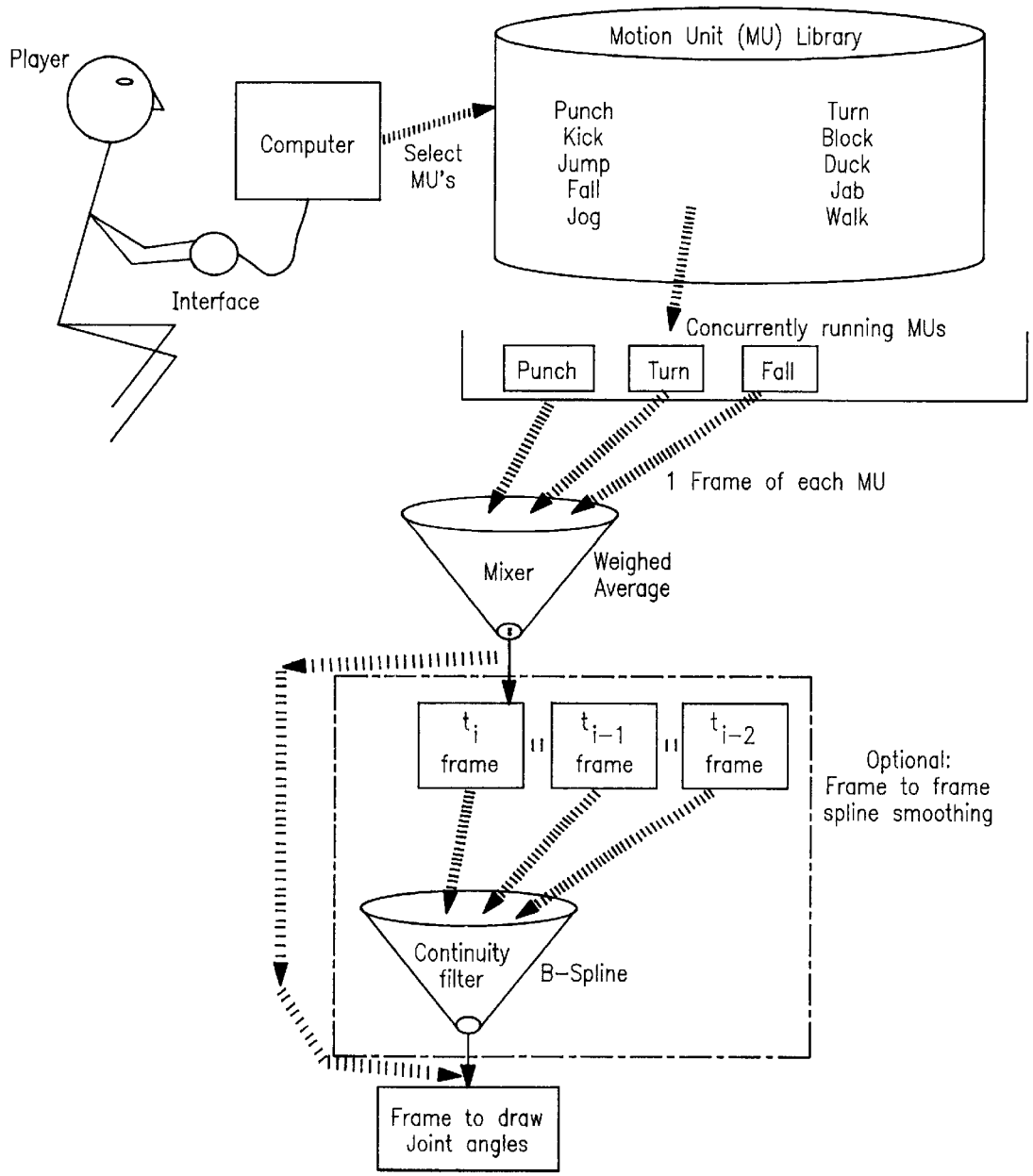
Figure 15:
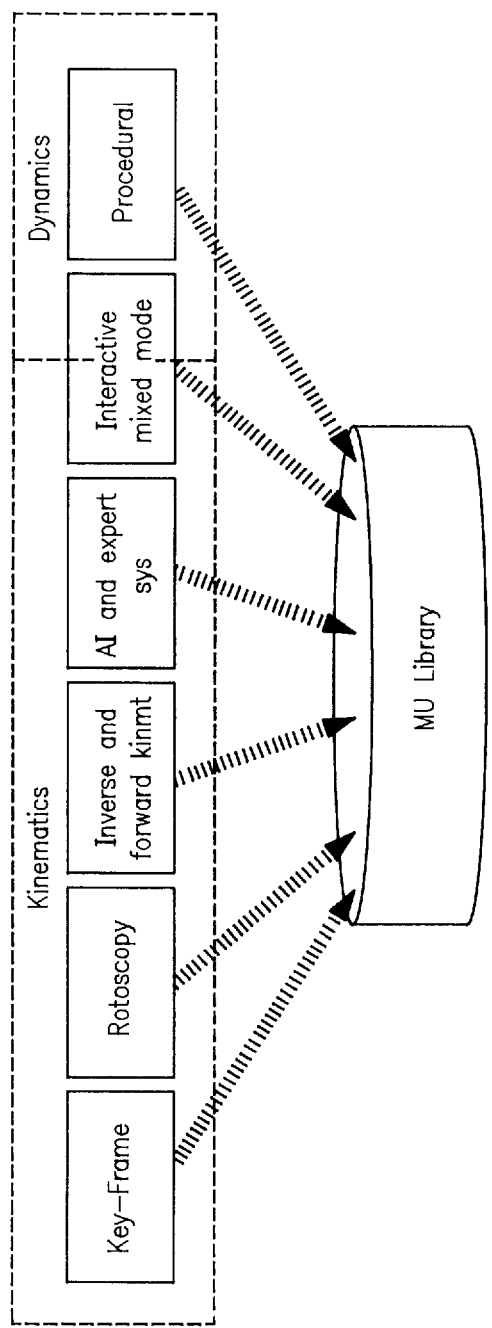
FIG. 15 shows possible ways the MUs in the MU Library of FIG. 14 (c) are produced.

FIGS. 14 (a)-(c) further show the details of the invention as shown in FIG. 1. The "player" and "interface" are the same as that of FIG. 1. A "player" interacts through the "interface" in FIG. 14 (a). The "computer" receives the user's input which selects MUs to mix. These selected MUs are mixed in the "MU Mix Algorithm". Then the resultant frame is rendered and displayed in the "Field of Vision" that can be seen by the player. FIG. 14 (b) shows the contents of the "MU Mix Algorithm" of FIG. 14 (a). From the "MU Library", MUs are selected by the player and added to the "Queue of MUs" that are concurrently running. The MUs on the Queue are mixed in the "Mix" by a weighted average calculation. Then the resultant motion is smoothed. The "computer" block of FIG. 1 is subdivided into the rest of this diagram, FIG. 14 (c). The overall application scenario is shown for the example of one player and one AF. The player selects MUs from a database (library) containing multiple MUs. An MU, asynchronously selected by the player, enters the queue of concurrently running MUs. By the algorithms of the invention, those MUs are mixed and merged to produce a description of each joint rotation of the AF. This is repeated frame after frame in an animation. The mixed motion can be further smoothed by a frame-to-frame smoothing technique described in the invention. The resulting motion description is entered into the Geometric Engine of FIG. 9 (b), and is later drawn in the field of vision.

An illustration of the preferred embodiment of the overall system is shown in FIG. 14 (c). In this figure, the user asynchronously selects various MUs to run. These MUs are added to the queue of concurrently running MUs. Each animation frame, one frame of joint data from each MU, is mixed in the "Mixer" in FIG. 14 (c). Here a weighted average of the joint's frame is calculated to determine the resultant joint rotation values for that frame. Each joint data element in an MU contains a weight which indicates its priority. Specific AF motions (i.e. jump, sit) are accomplished through the movement of key joints. Of course, many other non-key joints may also move, but they are not essential to the movement. For example, in a jump, the leg joint angles are essential, the arms are somewhat important but the neck or wrist joint angles are not important at all to the essence of a jump.

Figure 6A:
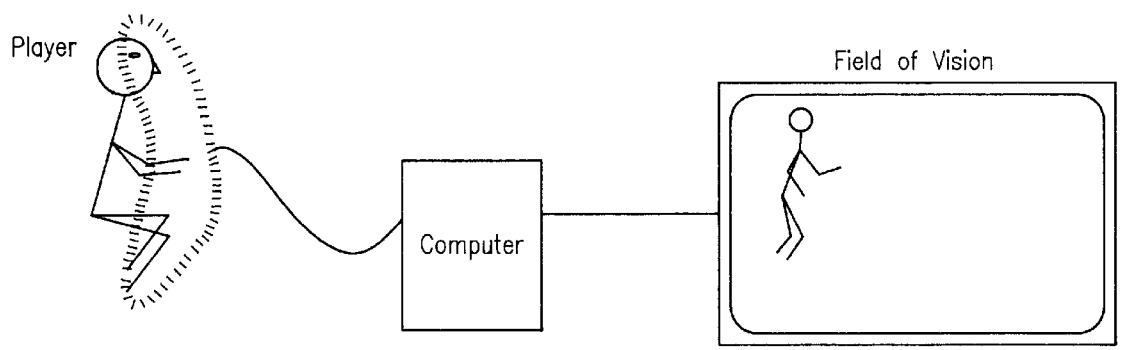
FIGS. 6 (a)–(b) show an exemplary embodiment of the invention.
Figure 6B:
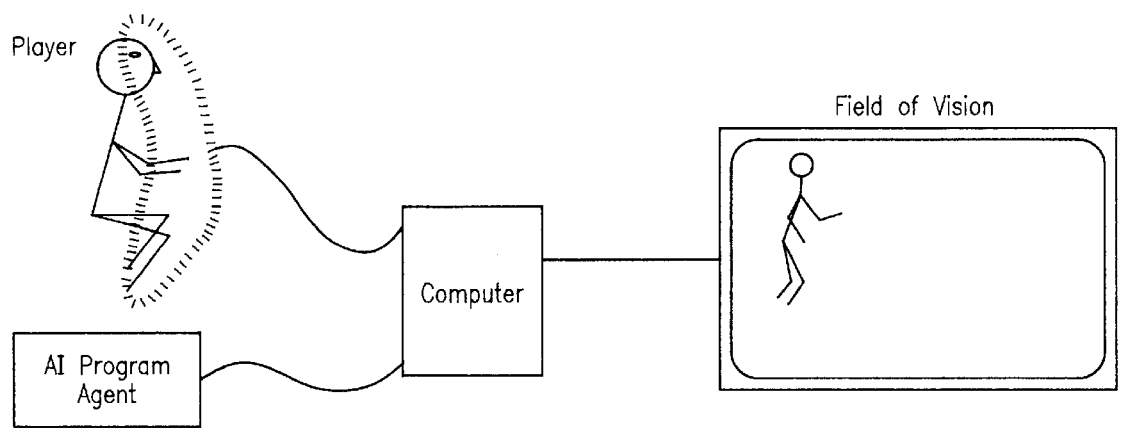

A preferred exemplary embodiment of the invention pairs one player to one AF as shown in FIG. 6 (a). In FIG. 6 (a), one human player controls the motion of one AF which is in the field of vision. The player selects MUs for the articulated figure to execute, and the articulated figure uses the resultant motion that was determined by the algorithms of the invention based on the selected MUs of the player. Moreover, a human player may work in cooperation with a computer module, the AI Program Agent, as seen in FIG. 6 (b). For example, the human would select high level goals and motions that are timed combinations of multiple MUs. The AI Program Agent provides the specific selection of MU at the appropriate time in order to fulfill the expressed motions desired by the human player. The AI program converts those high level goals into the low level MU selections that are then merged and mixed according to the invention. Another scenario is for the human player, as well as the AI Program Agent, to select MUs. Then these two sets of MUs are mixed by the algorithms of the invention to produce the resultant motion.

Figure 7A:
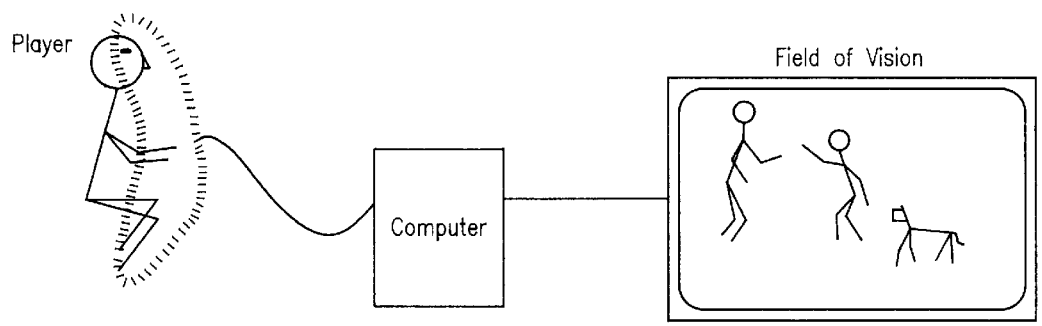
FIGS. 7 (a)–(b) show a further exemplary embodiment of the invention, involving multiple articulated figures in the field of vision.
Figure 7B:
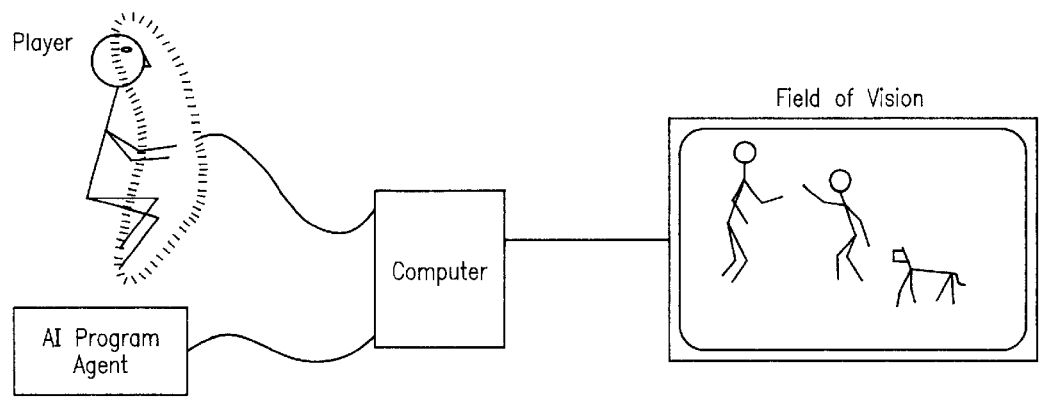

Further exemplary embodiments of the invention are shown in FIGS. 7 (a)-(b). In FIG. 7 (a), one human player controls the motion of a group of articulated figures. One example would be the player directed a sports team to accomplish a particular goal. The player selects MUs which instructs the movement of each AF of the game. In FIG. 7 (b), the human player works in cooperation with an AI Program Agent to coordinate the movement of the multiple AFs. For example, the human player could specify high level motions while the AI Program Agent specifies the lower level selection and timing of MUs to execute the stated high level motions as specified by the human player. Another scenario would have the human player controlling one group of the articulated figures, while the AI Program Agent controls other articulated figures. The two sets of articulated figures could be working in cooperation or competition.

Figure 8A:
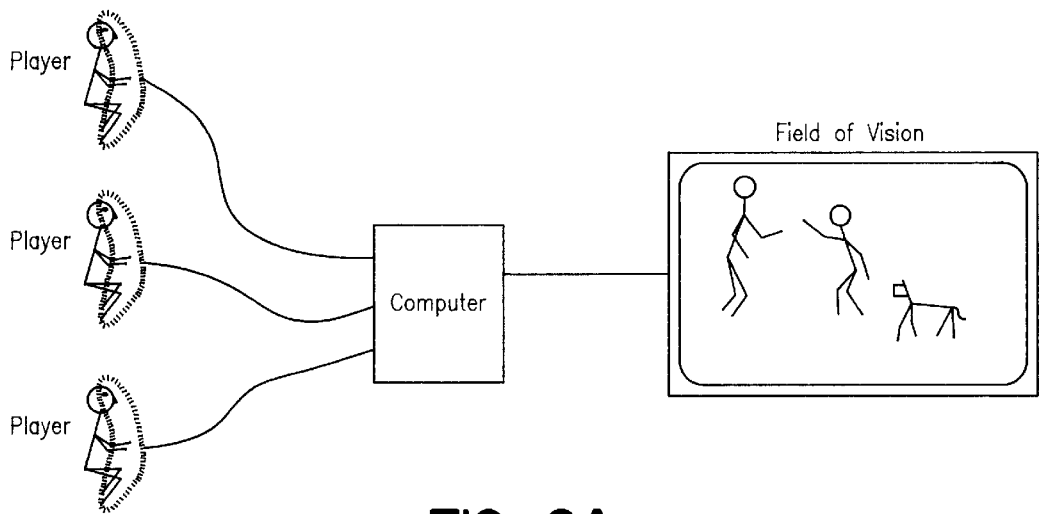
FIGS. 8 (a)–(c) show further exemplary embodiments of the invention.
Figure 8B:
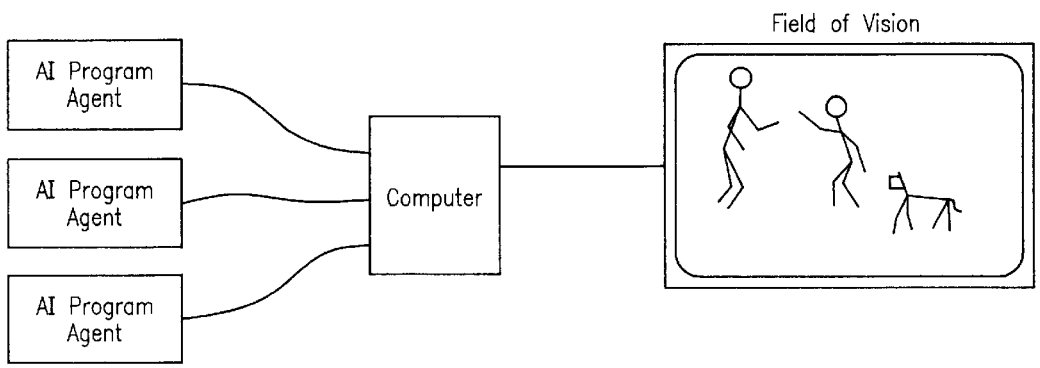
Figure 8C:
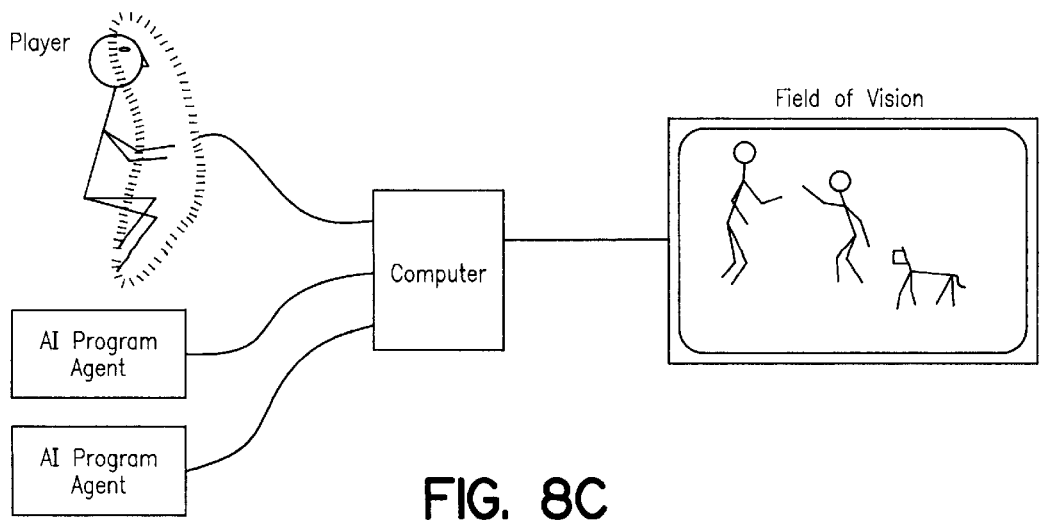

FIG. 8 (a)–(c) show further exemplary embodiments of the invention. FIG. 8 (a) shows an example of multiple human players controlling a multiple set of articulated figures. Either each player directs a different AF (or group of AFs), or multiple players work in unison as a team to control the motion of an AF (or group of AFs). The relation between a player and an AF could either be a one to one, or a one to many. That is, the MUs selected by a human player could control just one AF, or they could control a group of the articulated figures. FIG. 8 (b) shows a further embodiment depicting a scenario where no human player is involved. Only computer players, the AI Program Agents, are involved. An example of this is a simulation of a group of articulated figures. The AI Program Agents could be programmed to select MUs for the articulated figures that make them move in a way that simulates a situation such as a war game, crowd behavior, or human ergonomics study. Examples of this include a simulation of a group of people such as a military scenario, emergency scenario, human traffic flow at an airport simulation, or other such study in groups of AFs, where the AFs' behavior is determined by the corresponding controlling AI programs. This embodiment could be used for a research purpose in order to study and learn about the simulated AF behavior. Another simulation example would be an animated simulation of people moving in a design proposal of a new building, store, park, or factory. The articulated figures whose motions have been determined by the MU selected by the AI Program Agents would move in a computer graphics simulation of the design proposal of the new building. A video of this animation could then be shown to potential buyers, bankers, customers, politicians, or other interested people. Such simulations of AF behavior are an embodiment of the algorithms of the invention. Likewise, FIG. 8 (c) shows an embodiment of the invention which combines multiple human players and multiple AI Program Agents to select the MUs and thereby control the motions of multiple articulated figures. The multiple players, in any combination, can act in cooperation or in competition.

Figure 9A:
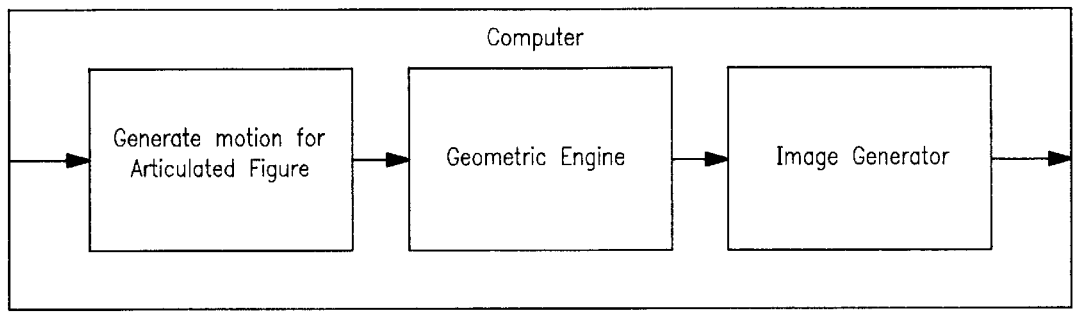
FIGS. 9 (a)–(c) further describe the "computer" block of FIG. 1.
Figure 9B:
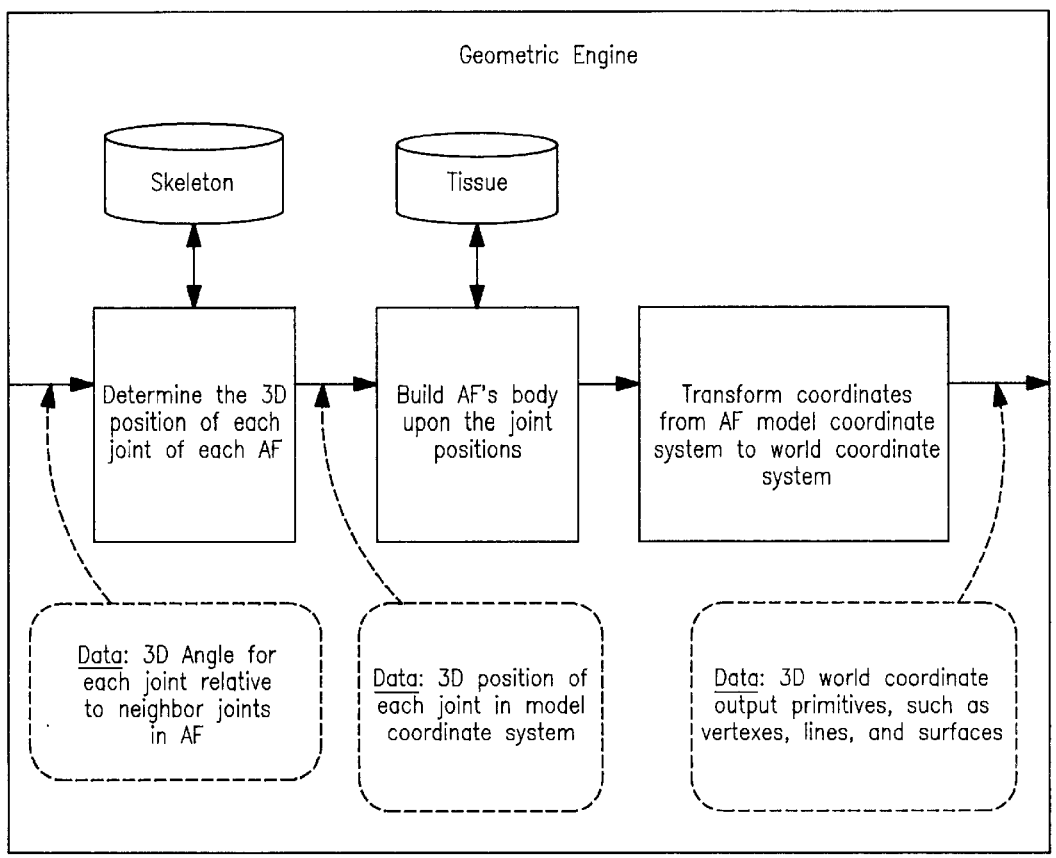
Figure 9C:
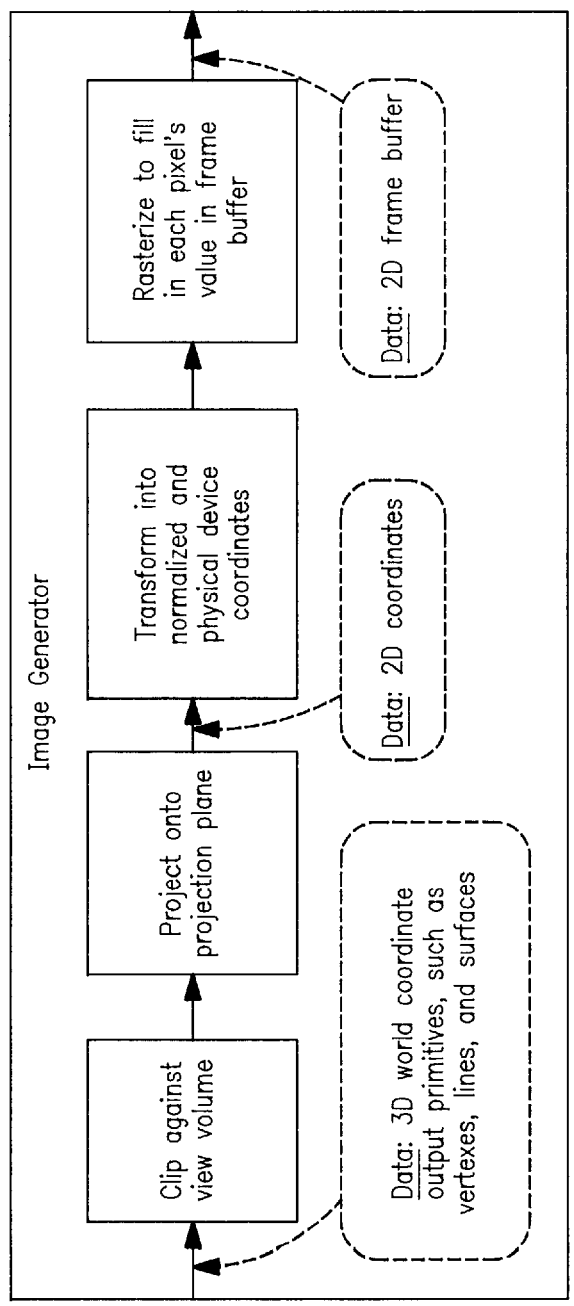

FIG. 9 (a) shows the computer of FIG. 1 in the preferred embodiment. The algorithm of the invention would be within the box labeled "Generate Motion for Articulated Figure". From the player's input through the interface, motion is generated for the AF(s), FIG. 9 (a). The computer then performs a conversion for each frame, and sends the calculated resultant motion of each articulated figure to the Field of Vision of FIG. 1, a Geometric Engine (of FIG. 9 (b)) and an Image Generator (of FIG. 9 (c)). The Geometric Engine of FIG. 9 (a) is expanded in FIG. 9 (b). The Geometric Engine of FIG. 9 (b) creates the 3D shape, orientation, and surfaces of the AF(s). The geometric engine is described in Foley J. D. and Van Dam A., "Fundamentals of Interactive Computer Graphics", Addison-Wesley Publishing Co., 1984, pp. 262–265, which is hereby incorporated by reference. Here, the body of the articulated figure is constructed in a model coordinate system and then transformed to the world coordinate system. The input to the Geometric Engine consists of all the 3D angle values for each joint relative to its neighbor joints in the AF. These 3D angle values are the output of the algorithms specified by this invention and represented in FIG. 9 (a) as the block labeled "Generate Motion for Articulated Figure". From these angle values, the 3D position of each joint is calculated. The length of each segment between two joints is necessary to this calculation. The length and connectivity information (i.e., which joint is connected to which other joint) are contained in the block of information depicted as the computer disk labeled "skeleton" in FIG. 9 (b).

The output data stream of the first function in FIG. 9 (b) is the 3D positions of each joint for one frame in the animation. These 3D joint positions are input to the second function in FIG. 9 (b). This second function determines the surface of the tissue based on the neighboring joint positions. This is explained in Dow D., Semwal S., Maehara, F., "Modeling Complex Human Shape Using Flexible Object Oriented Methodology", Proceedings of NICOGRAPH '92, Tokyo, Nov. 1992, pp. 35–43, which is hereby incorporated by reference. The additional model data required to determine the surface of the tissue is obtained from the data block depicted in FIG. 9 (b) as a computer disk labeled "tissue". Given the 3D position of the surrounding joints, the surface of that body region can be calculated and represented in various ways, including simple geometric shapes, polygon meshes, free form surfaces, or volume voxels. Each of these representations of the surface tissue is an appropriate way to use the output data produced by the algorithm of this invention.

Finally, the calculated surface representation data is passed from the second function of FIG. 9 (b) to the third function. In this third function, the representation of the surface of each body region of the AF is correctly positioned and oriented in the "world coordinate system" of the computer scene. In simple terms, this transformation puts the AF in the correct place and orientation in the scene currently being displayed on the computer display. A further explanation of this transformation of coordinate systems that is used in 3D computer graphics systems can be found in Foley and Van Dam.

The output data stream of the Geometric Engine is the output of the said third function of FIG. 9 (b). This can be considered to be a display list of 3D points representing the basic graphic primitives that will be drawn on the computer screen. Such primitives include vertex points, line segments, polygon surfaces, and volume voxel density values.

The Image Generator of FIG. 9 (a) is expanded in FIG. 9 (c). The Image Generator shown in FIG. 9 (c) converts those 3D descriptions from the Geometric Engine into a 2D image for display in the field of vision of FIG. 1. The image generator is described in Foley and Van Dam, cited above, pp. 267–274, which is hereby incorporated by reference. The input data to this Image Generator are the 3D world coordinate output primitives, such as vertexes, lines, and surfaces. The Image Generator converts these 3D coordinates into a 2D projection plane. Finally, the 2D projection plane coordinates are rasterized to fill in the pixel values in a 2D frame buffer. The frame buffer data is in a form that can be directly sent to the display for viewing by the human player.

The articulated figures in various embodiments of the invention can have various joint configurations and various body surface methods. FIGS. 10 (a)–(d) show four different ways to model or represent a joint in the AF. Each of those joints is an acceptable embodiment of the invention. The important thing is that regions of the articulated figure have motions that can be modeled by rotations about the center of the joint. An articulated figure is a 3D shape described by the rotation at the joints. FIG. 10 (a) shows an example of two static segments which pivot on a common axis which is the joint. FIG. 10 (b) shows a ball-and-socket type joint. In this joint the segments can be oriented in any 3D rotation around the joint. FIG. 10 (c) shows an AF shape that could be in a computer-generated world, where the segments are separated and do not physically or graphically touch, yet they rotate at a joint. FIG. 10 (d) shows an example where the segments are not distinctly and separately defined; instead, the segments have merged into one, and the surface bends and rotates at the joint. An example of FIG. 10 (d) is the human elbow joint, upper arm, and lower arm.

Figure 12A:
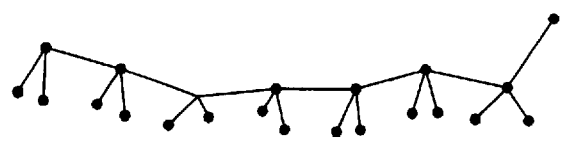
FIGS. 12 (a)–(b) show two possible AF skeleton shapes that are different from any human-like shape.
Figure 12B:
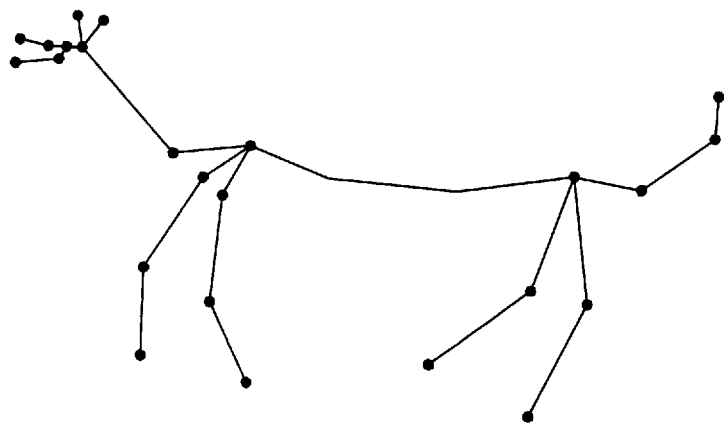

As shown in FIGS. 11 (a)–(b) and FIGS. 12 (a)–(b), the number of joints or the configuration of joints in the articulated figure can be of various embodiments. The figures in FIG. 11 (a) and in FIG. 11 (b) have a 3D surface which is not visible in the drawing. FIGS. 11 (a)–(b) only show the joints (round black dot) and the relation between the joints as represented by the line connecting the two joints. The line can be considered to be similar to a skeleton of a human, or a frame, or segment-link of a robot. FIGS. 12 (a)–(b) show two possible AF skeleton shapes that are different from any human-like shape. In the AF described in the invention, a composite 3D shape which can be described by 3D rotations at joints connecting the limbs or segments is an AF that can be manipulated by the algorithms described in the invention.

Figure 13:
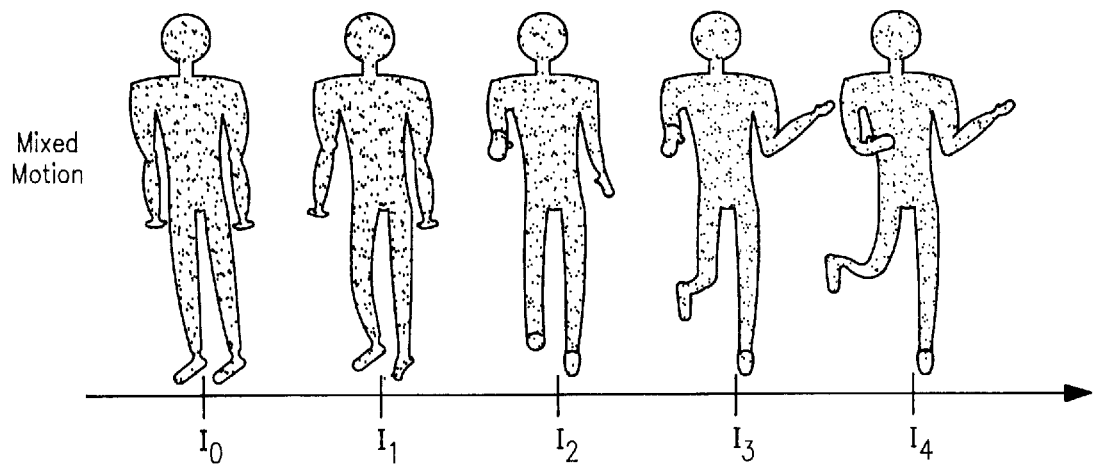
FIG. 13 shows an example of an outer surface of an AF.

FIG. 13 shows one example of an outer surface of an AF. The joints and skeleton of the AF in FIG. 13 are similar to the ones shown in FIGS. 11 (a)–(b). The AF in FIG. 13 moves according to the motion algorithms of the invention.

The invention uses mathematical weighted average calculations as described in this document to manipulate the angle rotations of corresponding joints of concurrently running MUs to determine the resultant angle of that joint. So the number of joints in an AF, or the configuration of the joints to form the AF, can vary among different embodiments of the invention, so long as the MUs and the articulated figures have the same number of joints and angle values.

To encode the essence for each motion, the joints are given a weight. This weight determines the joint's relative priority to the purpose of a particular movement. When two or more MUs are mixed together, a weighted average of the combined joints determines the resultant joint angles.

$$\theta_J = (\Sigma^n_{i=0} w_{i,J} \theta_{iF,J})/(\Sigma^n_{i=0} w_{i,J}) \qquad (1)$$

where:

$\theta_J$=rotation of J-joint, the calculated resultant angle
i=which MU from queue of running MUs
J=which joint in AF
n=number of MUs currently on the queue
$\theta_{iF,J}$=rotation values of the i-MU's F-frame and J-joint
$w_{i,j}$=joint weight: weight for the J-joint of the i-MU The J in the equation is the same as the J Joints of FIG. 17. Each frame F of an MU has rotation data for each joint of the AF. Likewise, the above F in equation (1) is also the F Frames of FIG. 17. The MU_index in FIG. 18 keeps track of which frame F is the next frame of the MU to mix in equation (1).

FIG. 17 shows the file specification of an MU. An MU consists of a series of data for frames, one frame after another, to describe the animation of the AF. Each of the frames consists of a long vector of rotation angles for each joint. In one embodiment of the invention, the stored rotation data for each joint consists of 3 angle values: $(\theta_z, \theta_x, \theta_y)$.

This data can form a sort of matrix as pictured in FIG. 17, where there is a series of frames, F, and each frame consists of a series of joint data, J.

Figure 18:
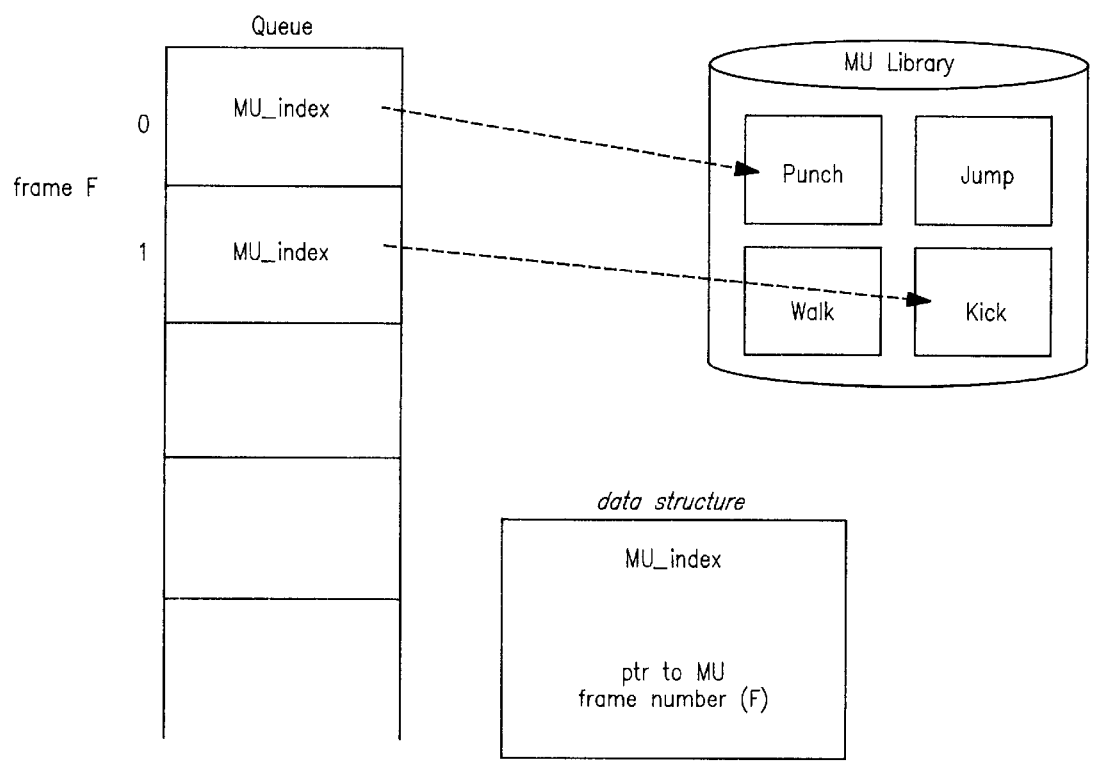
FIG. 18 shows an embodiment of the queue of concurrently running MUs as shown in FIG. 14 (c).

FIG. 18 shows an embodiment of the queue of concurrently running MUs as shown in FIG. 14 (c). In the example shown in FIG. 18, there are two MUs currently on the queue of running motion units. The actual data on the queue stored in this embodiment of the invention consists of a data structure that contains at least two items: a point to the actual MU data in the MU library, and the current frame number, F. This frame number keeps track of the current frame in the MU that is to be run next. The weighted joint angle calculation of the invention refers to this frame number, F to determine which actual frame of the MU needs to be mixed with other frames from the other MUs on the queue of running MUs.

If all $w_{ij}$=1, then the final rotation value is simply the average of the rotation values for each joint from each frame to be mixed. The weights give a priority to the joint rotations. This way, when two or more motions are merged, the joint rotations that have a higher weight have a higher priority and they more strongly influence the resultant motion.

Figures 16A, 16B:
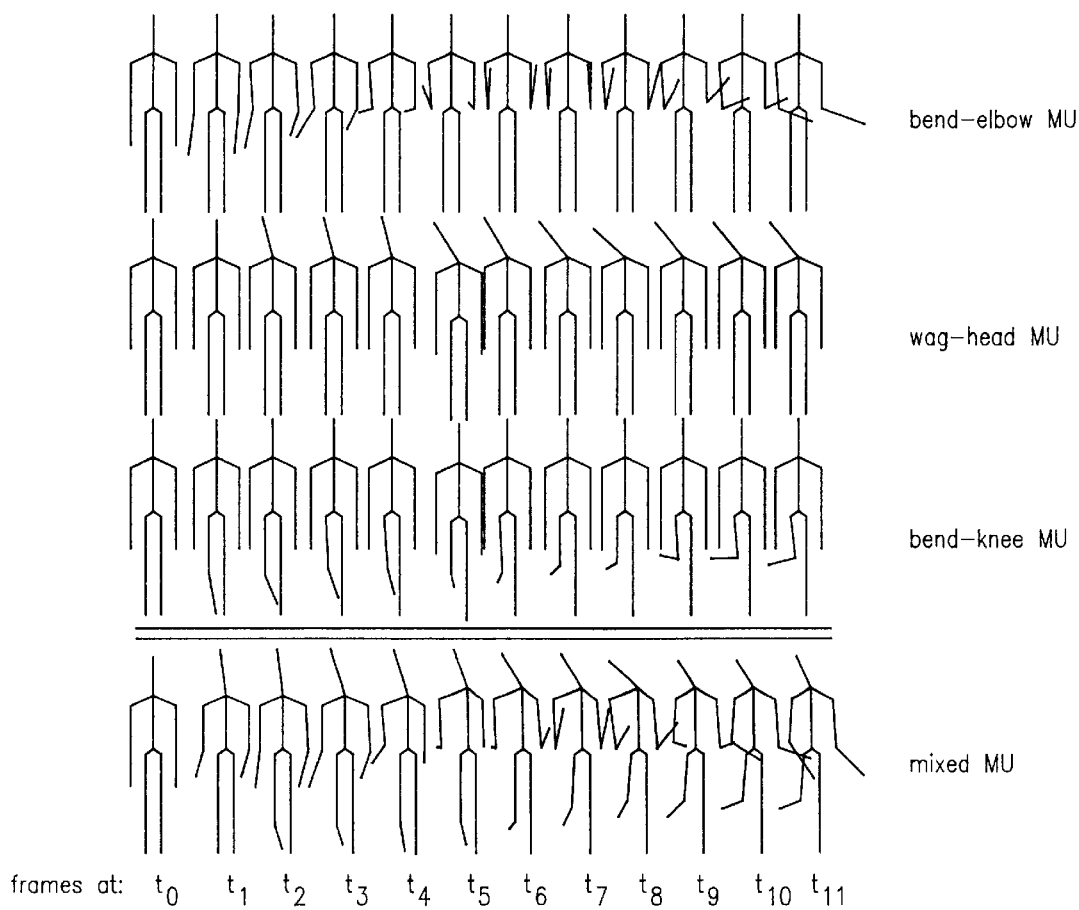
FIGS. 16 (a)–(c) show three MUs being mixed according to the method of the invention to produce the resultant mixed MU motion for the AF.
Figure 16C:
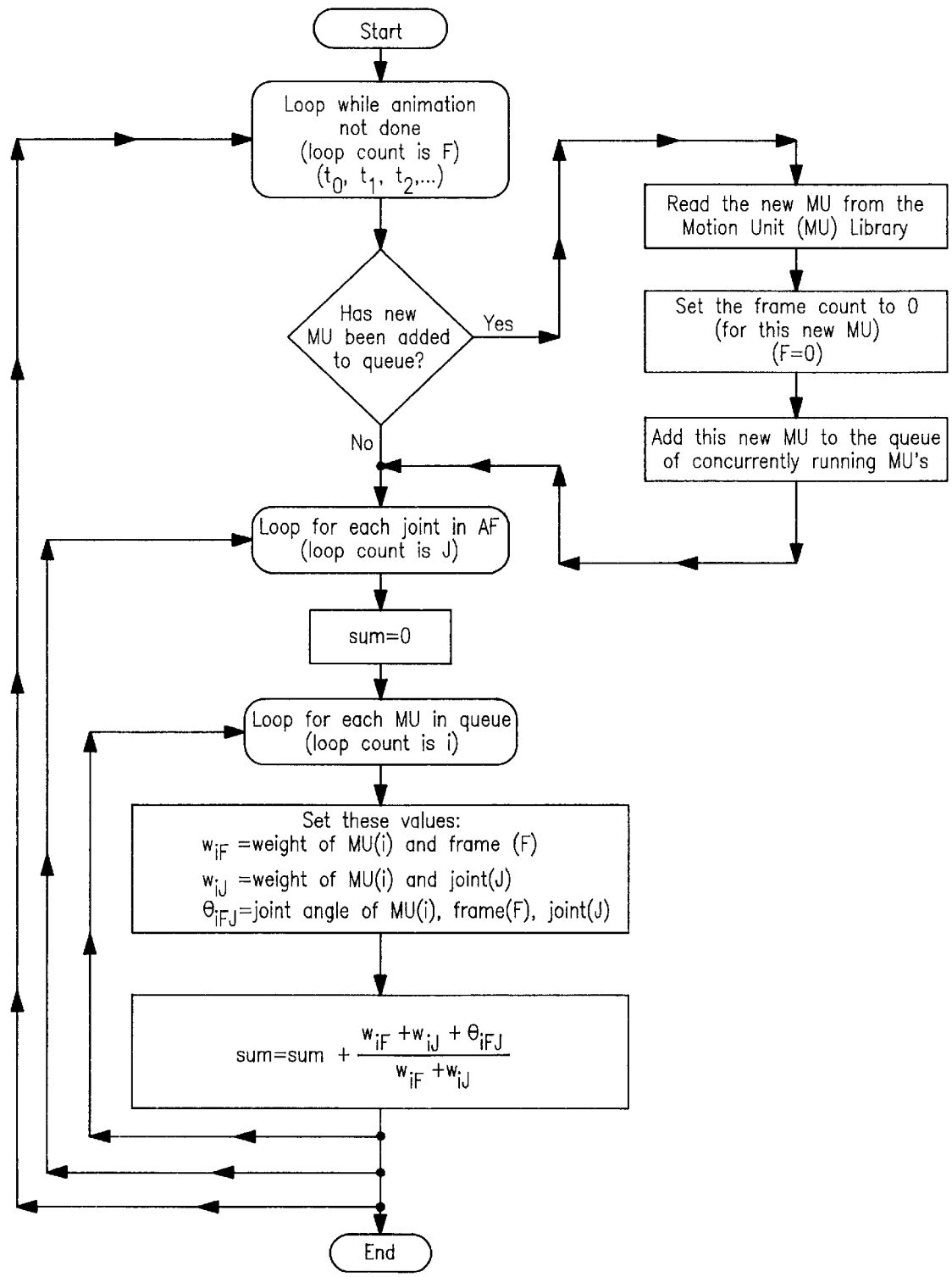

Consider an example which combines three simple motions. One MU is a kick (bend-knee), one is a punch (bend-elbow), and the other is a head shake (wag-head). FIG. 16 (a) shows the original three motions and the composite result.

In this example, the bend-elbow MU that has previously been stored in the MU Library of FIG. 14 (c) has been selected by the player to run concurrently with the wag-head MU and the bend-knee MU (also from the MU Library). These motions are mixed by the weighted average calculation of the invention to produce the mixed MU shown at the bottom of FIG. 16 (a).

In the kick motion, the leg joint motions are essential to the "kick" motion, so they are given a higher weight of 1.0, and the rest are given a low weight like 0.1. Likewise, with the punch, the arm joints are given a weight of 1.0, and the rest are given a weight of 0.1. With the head shake, the head's weight is 1.0, and the rest are given a weight of 0.1. When these motions are run at the same time, a weighted average is calculated to determine the resultant joint angle from the three input MUs.

Consider a leg joint. For some frame in the motion sequence, the leg joint weight is:

Kick MU: w=1.0
Punch MU: w=0.1
Head Shake MU: w=0.1

$$\theta_{Leg} = (w_{Kick}\, \theta_{Kick} + w_{Punch}\, \theta_{Punch} + w_{HdShk}\, \theta_{HdShk})/ \qquad (2)$$
$$(w_{Kick} + w_{Punch} + w_{HdShk}) =$$
$$((1)\, \theta_{Kick} + (0.1)\, \theta_{Punch} + (0.1)\, \theta_{HdShk})/1.2$$

The kick's weight of 1.0 is much larger than the 0.1 weight of the other MUs. Therefore, of the three MUs that are mixed, the kick MU dominates leg joints.

As seen in FIG. 14 (c), the motion mix algorithm described above computes a weighted average of joint angles to be merged. However, since the user selects new motions asynchronously, there could be a frame-to-frame discontinuity that would produce an unnatural motion. This discontinuity problem during the transition from one dominate motion to the next has been called Badler phrasing (described in Steketee S. N., Badler N. I., "Parametric Keyframe Interpolation Incorporating Kinetic Adjustment and Phrasing Control", Proc. SIGGRAPH 1985, Computer Graphics, Vol. 19, No. 3, pp. 255–262 and which is hereby incorporated for its teaching that a motion unit is like a phrase of words).

Figure 19:
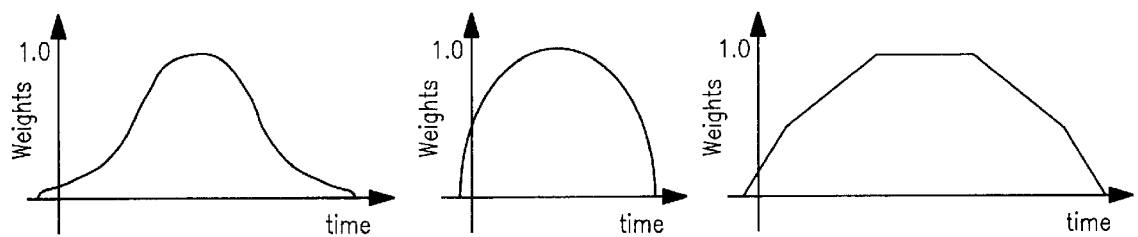
FIG. 19 shows various embodiments of the frame ramp weights of the invention.

To solve this phrasing problem, the invention uses a weight factor that is a variable of time. The weight gradually increases from zero at the start of an MU and finally decreases at the end. This minimizes the rough transition between two MUs. FIG. 19 shows various possibilities of how the weight of an MU frame could change over time. To minimize rough transitions, the frames near the start and near the end of an MU are made small. Basically, in the preferred embodiment, the initial frames of an MU have a lower weight, the middle frames of the MU have a relatively higher weight, and the final frames have a lower weight. The effect of these frame weight patterns is to enhance the smoothness of the transitions at the beginning and end of MUs so that the resulting mixed motion is smoother. Also these frame weights can be used to manipulate and stress important frames of the MU.

Figure 20:
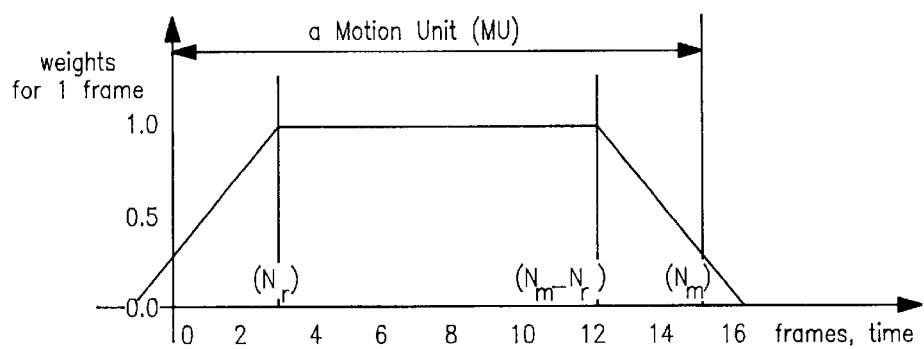
FIG. 20 shows a further embodiment of the frame ramp weights.

A preferred embodiment of the phrasing weight is shown in FIG. 20. In FIG. 20, $N_m$ is the number of frames in the MU to which this frame weight pattern is applied. $N_r$ is the number of frames that linearly increment up from the low weight to the higher weight. The converse is true for the final $N_r$ number of frames in this MU. An MU is defined from frames 0 to $N_m$ in FIG. 20. In the first few frames of the motion, the frame has a low priority. But gradually, frame by frame, the weight is increased. Likewise, at the end of an MU, the weight of the last few frames diminishes. Therefore, at the beginning and end of the MU, the frames have a low priority, so they do not have much influence on the resultant composite motion. However, the middle frames are at their full priority, so they do significantly influence the composite.

The original equation (1) does not include this frame weight. So the more complete equation is:

$$\theta_J = (\Sigma^n_{i=0} w_{iF} w_{iJ} \theta_{iFJ}) / (\Sigma^n_{i=0} w_{iF} w_{iJ}) \quad (3)$$

where:

$w_{iF}$ weight for i-frame (weight applies to all joints in frame)

Basically, the weight of a frame is multiplied by the weight of a joint to produce the resultant weight of that joint. In the example shown in FIG. 16 (a), each resultant "mixed MU" time step ($t_0, t_1, t_2, \ldots$) is calculated independently. The inputs to this calculation for $t_i$ are the $t_i$ "bend-elbow MU", the $t_i$ "wag-head MU", and the $t_i$ "bend-knee MU" joint angle values. The angle of each joint is calculated independently of the other joints. This follows directly from equation (3). Equation (3) is expanded in FIG. 16 (b) so that it directly corresponds to the example of FIG. 16 (a). For the calculation to determine the angle of a single joint for a single step $t_i$, the product of each of the three MUs is summed.

The flow chart in FIG. 16 (c) further explains FIG. 16 (a), FIGS. 14 (a)–(c) and equation (3). The largest loop in FIG. 16 (c) executes once per time step; that is, one time for each frame in the animation of the AF in motion. The next smaller loop executes once for each joint in the AF. This performs the calculation of equation (3).

FIG. 16 (c) also shows the existence and functionality of the "Motion Unit Library" and the queue of "Concurrently Running MUs". As shown in FIGS. 14 (a)–(c), when the player selects a new MU to start, that MU is inserted from the Motion Unit Library into the queue of Concurrently Running MUs. When this new motion is completed (probably many time steps, $t_i$, later) it is taken off the queue of "Concurrently Running MUs". Therefore, this queue is dynamic. The MUs on the queue may change each time step. More MUs might be added, and complete MUs will be taken off the queue. The smallest, innermost loop of FIG. 16 (c) executes once for each MU that is on the queue of "Concurrently Running Mus".

Before considering a further example of how the weights from many different MUs interact, it is important to understand the idle motion.

At the bottom of the priority list of running MUs is always the idle MU. For each application the idle is a different type of motion. For instance, a sports game might have the idle MU be a jog-in-place motion. But, an animation explaining cooking or wood-working might have the idle MU be a standing position with the hands held about 10 cm above the table top.

The idle MU has a very low priority weight, so if another MU is running, that MU will dominate. However, the idle MU dominates when no other MU is currently running. During the transition at the end of a MU, the MU's weight priority for the last few frames becomes less than the priority of the idle MU, so a transition occurs between the ending MU and the idle MU.

To better explain the phrasing control and the idle MU of the invention, an example of the preferred embodiment will be discussed. Consider the example in FIG. 21 which shows the queue of MUs that the user has selected to run. The following list explains which MUs are mixed at what times and which MUs dominate.

$t_0$ No MUs are selected by the user, idle MU dominates $t_1$ Kick MU dominates $t_2$ Kick MU and Punch MU both have low weights. Mix of those and idle MU $t_3$ Punch MU and Nod-Head MU equally dominate Here motions start and stop asynchronously. Concurrently different MUs run, and the net result is based on a weighted average calculation of the joints in each MU that are being mixed. A player has asynchronously selected the three MUs in FIG. 21: Kick MU first, then later the Punch MU, and later the Nod-Head MU. Each of these MUs has a frame weight pattern as seen in FIG. 20. For example, the Kick MU's first frame is executed at time $t_a$, while the last frame at time $t_b$. In addition to the three MUs that the player has asynchronously selected, a continuously running Idle MU (jog MU) is active. This Idle MU has a comparatively low frame rate for all its frames, and it serves in this embodiment of the invention as a background motion for the AF to move according to when no other player-selected MUs are running. For example at time $t_o$, the player has not selected any MU to run yet (the Kick MU starts later at time $t_a$), so the Idle MU is the only MU running at time $t_o$.

One embodiment of the invention simulates an emotional state for an AF. A value determines the strength of this emotional state in how much it affects the resultant outcome of the AF motion. For example, the emotional state of being tired, exhausted, or lazy can be simulated. Another background MU is added to the queue of running MUs. This MU is always on the queue because the MU_index of FIG. 18 is set so that the frame number returns to the first frame in the MU after the last frame in the MU has been executed. This is the same as used by the Idle MU: it loops on the queue, never ending.

Figure 21:
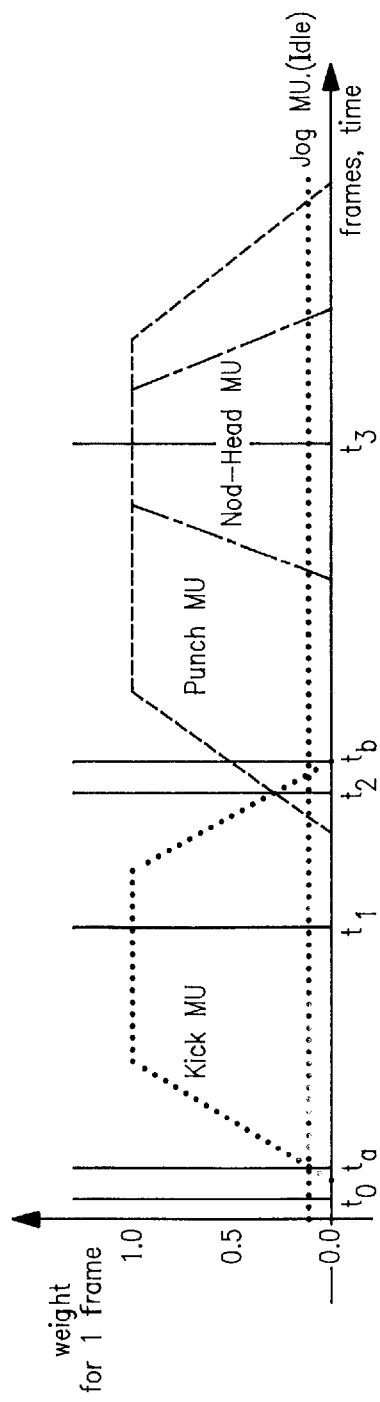
FIG. 21 shows an example of the invention mixing MUs.
Figure 22A:
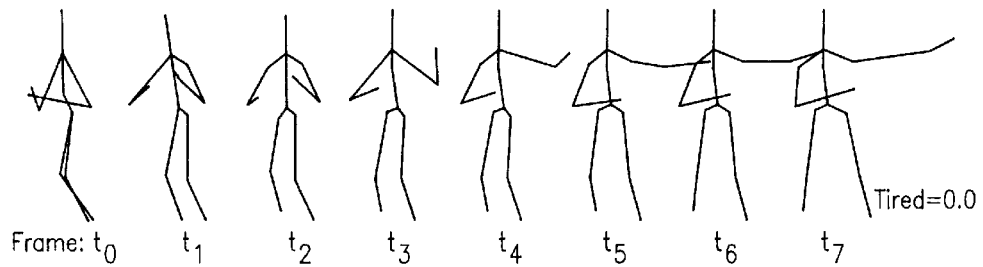
FIGS. 22 (a)–(c) show a simulation of the fatigue that is possible in an exemplary embodiment of the invention.
Figure 22B:
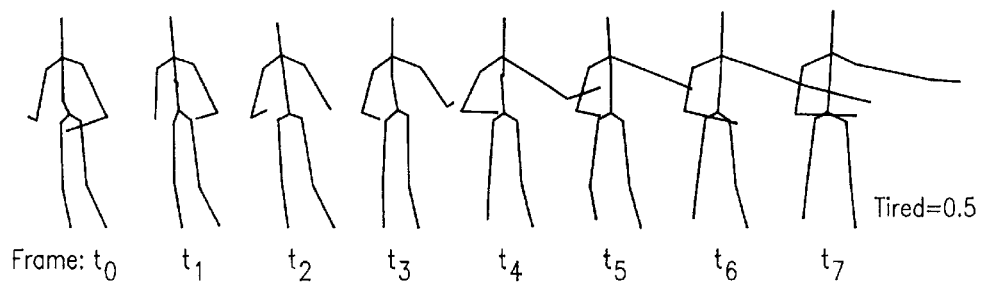
Figure 22C:
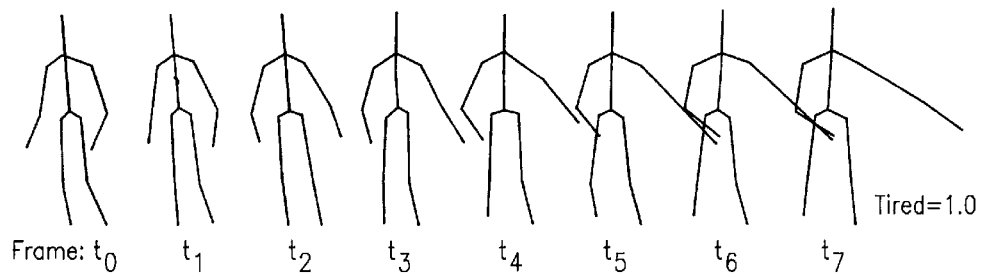

As a real human becomes more and more tired, he tends to move less vigorously and more lethargically. That is, as one becomes tired, movement is minimized, thereby conserving energy. FIGS. 22 (a)–(c) show a simulation of the fatigue that is possible in an exemplary embodiment of the invention. A background MU, similar to the above Idle MU of FIG. 21, is added to the queue of running MUs. As a value called tired (fatigue) rises from 0 to 1, the weight of this looping tired MU increases from 0 to 1, causing the AF to behave more and more according to the tired MU motion.

In other words, to implement the tired simulation in one embodiment of the invention, a weighted MU representing an exhausted body position is added to the queue of MUs being mixed. If the AF is healthy and not tired, the tired-MU's weight is 0, so it has no effect on the resulting motion. But as the AF becomes increasingly tired, the weight of this tired MU increases from 0.0 to 1.0.

For example in FIG. 22 (a), a normal MU is shown (tired=0.0). In 22 (b) the actor is more tired so the motion is less energetic (tired=0.5). In 22 (c), the motion is very lethargic (tired=1.0).

In addition to the above phrasing control, an additional frame-to-frame smoothing technique is optionally a part of the invention. As seen in FIG. 14 (c), for each frame in the animation, the motion mixer combines one or more frames in a weighted average calculation to produce this resultant frame. Even though this is a weight average of the joint weights, and phrasing control weights have been used to minimize the discontinuity at the start and end of MUs, there could still be some frame-to-frame discontinuity. Spline smoothing of animation frames could be used to smooth this.

Each application has different requirements of smoothness of motion, and constraints on processing power. Many simpler applications will skip this frame spline calculation and directly animate the character as calculated by the weighted sum calculation. Others will do a more sophisticated spline smoothing.

A compromise of the demands of smoothness and low computational power can be achieved by using a fixed spline calculation. This reduces the somewhat complicated spline calculation to just another weighted average calculation. The preferred embodiment of the invention uses a frame-to-frame smoothing filter based on a nonperiodic B-Spline using three frames' joint rotation values. The B-Spline derivation can be found in other works (described in Mortenson M. E., Geometric Modeling, John Wiley & Sons, 1985, pp. 125–147 and which is hereby incorporated by reference for its teachings on B-Spline derivation). The equation for a nonperiodic B-Spline using three points:

$$p_i(u) = \frac{1}{2}[(1-u)^2 p_{i-1} + (-2u^2 + 2u + 1)p_i + u^2 p_{i+1}] \quad (4)$$

This calculates a smooth curve between the three points for a range of u from 0 to 1.0. The goal is to ensure continuity as MUs are being mixed and running concurrently. Various types of spline calculations could do this. The preferred embodiment uses the above described B-Spline that determines a point at u=0.75 for each frame in the animation.

Another advantage of using splines in this way is that each calculated frame can be considered as a key-frame. Then the well developed algorithms of key-frames can be used to calculate any in-between frame that is desired. This allows the application to have control of the output frame rate, regardless of the frame rate of the stored MUs that is being used. In-between frames can be calculated to speed up or slow down the animation.

Nevertheless, the major goal of all the motion algorithms presented in the invention is to provide a fast way to allow user-based AF animation in low end platforms such as PCs or games. Therefore, in many cases, splines (to ensure continuity between frames) may be too slow a calculation for many platforms. If so, this step can be skipped. The output of the weighted averages becomes the AF's orientation in that frame of the animation. Continuity is not ensured, but the phrasing control technique of the priority ramp at the beginning and end of each MU helps to minimize sudden changes in the rotation of any joint in the body during transitions of MUs.

The algorithms in the invention fill the need caused by the recently made available affordable PCs and game platforms. These platforms are now powerful enough to do exciting animations, including AF animation. However, they are not yet powerful enough to directly use the wealth of AF animation techniques that have been developed.

The invention contributes a user-based set of algorithms that allow the end user of a game or educational software to interactively and intuitively choose and mix stored Motion Units in the course of running an application that moves articulated figures. Off-line, other well-developed techniques can be used to create the MUs. These MUs are mixed and run on a low end platform using the fast algorithms discussed here.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A computer implemented method of manipulating at least a first and a second motion unit to generate motion for an articulated figure in a sequence of frames in computer animation, said articulated figure including a plurality of joints and each motion unit defining the rotations of each joint in the articulated figure for a particular motion, the method comprising the steps of:

assigning a first weight to each joint in the articulated figure, the first weight being defined by a first motion unit for a first motion, the weight of each joint indicating the priority of that joint relative to other joints in the articulated figure during the first motion, said weight of each joint being independent of a destination of the joint;

selecting a first motion unit for execution and at least a second motion unit for a second motion and for concurrent execution with the first motion unit, the second motion unit defining a second weight for each joint in the articulated figure indicating the priority of the joint relative to other joints in the articulated figure during the second motion; and assigning a second weight from the second motion unit to each joint in the articulated figure, thereby associating a first and second weight with each joint in the articulated figure indicating the priority of the joint in the first and second motions;

generating a motion in the articulated figure by combining the first and second weights and the joint rotations assigned to each joint by the first and second motion units, wherein for a first selected motion unit, the articulated figure performs the first motion unit, and during the time the first motion unit is being performed, the weights of the joints defined by the second motion unit are combined with the weights of the joints in the first motion unit.

2. A method according to claim 1, wherein the step of combining includes combining the first and second motion units averaging the weights assigned to each joint in the articulated figure.

3. A method according to claim 1, wherein the steps of assigning weights include assigning the first and second weights to each joint in the articulated figure according to a predetermined priority scheme.

4. A method according to claim 1, including the further step of creating and storing the motion units in a library prior to the step of selecting the plurality of motion units.

5. A method according to claim 1, including the further step of decreasing the motion of the articulated figure at a beginning and at an end of each of the first and second motion units.

6. A method according to claim 1, including the further step of frame-to-frame smoothing which combines two or more frames using a weighted average to reduce discontinuities between adjacent frames.

7. A method according to claim 1, wherein the articulated figure represents a human and one of said motion units indicates a degree of fatigue of the articulated figure.

8. A method according to claim 1, wherein one of said motion units is an idle motion unit that controls the motion of the articulated figure only when the user has not selected any other motion unit.

9. A method according to claim 1, wherein each of the motion units is added to a queue of concurrently running motion units.

10. A method according to claim 1, further comprising:
    assigning a frame weight to each frame in said sequence of frames;
    wherein the step of combining includes combining the motion units in accordance with a calculation based on the weights assigned to each motion unit and the frame weight of each frame.

11. A computer implemented system for manipulating at least a first and a second motion unit to generate motion for an articulated figure in a sequence of frames in computer animation, said articulated figure including a plurality of joints and each motion unit defining the joint rotations for a particular joint in the articulated figure, the system comprising:
    first means for assigning a first weight to each joint in the articulated figure, the first weight being defined by a first motion unit for a first motion, the weight of each joint indicating the priority of that joint relative to other joints in the articulated figure during the first motion, said weight of each joint being independent of a destination of the joint;
    selection means for selecting a first motion unit for execution and at least a second motion unit for a second motion and for concurrent execution with the first motion unit, the second motion unit defining a second weight for each joint in the articulated figure indicating the priority of the joint relative to other joints in the articulated figure during the second motion;
    second means for assigning a second weight from the second motion unit to each joint in the articulated figure, thereby associating a first and second weight with each joint in the articulated figure indicating the priority of the joint in the first and second motions; and
    means for generating a motion in the articulated figure by combining the first and second weights and the joint rotations assigned to each joint by the first and second motion units,
    wherein for a first selected motion unit, the articulated figure performs the first motion unit, and during the time the first motion unit is being performed, the weights of the joints defined by the second motion unit are combined with the weights of the joints in the first motion unit.

12. A system according to claim 11, wherein the means for generating a motion includes further means for calculating an average of the assigned weights for the selected motion units.

13. A system according to claim 11, wherein the first and second means for assigning the weights each include further means for prioritizing the motion units according to a predetermined priority.

14. A system according to claim 11, further comprising means for creating and storing the motion units in a library.

15. A system according to claim 11, further comprising means for decreasing the motion of the articulated figure at a beginning and at an end of each of the motion units.

16. A system according to claim 11, further comprising frame-to-frame smoothing means to smooth said motion, wherein said means combines two or more frames using a weighted average to reduce discontinuities between adjacent frames.

17. A system according to claim 11, wherein the articulated figure represents a human and one of said plurality of motion units indicates a degree of fatigue of the articulated figure.

18. A system according to claim 11, wherein one of said motion units is an idle motion unit that controls the motion of the articulated figure only when the user has not selected any other motion unit.

19. A system according to claim 11, wherein each of the motion units is added to a queue of concurrently running motion units.

20. A system according to claim 11, further comprising:
    means for assigning a frame weight to each frame in said sequence of frames;
wherein the means for combining the selected motion units combines said motion units in accordance with a calculation based on the weights assigned to each motion unit and the frame weight of each frame.

* * * * *